United States Patent Office 2,963,505
Patented Dec. 6, 1960

2,963,505

SULPHOXIDES-CONTAINING ESTERS OF THE PHOSPHORIC AND THIOPHOSPHORIC ACIDS

Rudolf Muhlmann and Walter Lorenz, Wuppertal-Elberfeld, and Gerhard Schrader, Wuppertal-Cronenberg, Germany, assignors to Farbenfabriken Bayer Aktiengesellschaft, Leverkusen, Germany, a corporation of Germany No Drawing. Filed Mar. 14, 1957, Ser. No. 645,913

Claims priority, application Germany Nov. 6, 1954

9 Claims. (Cl. 260—461)

This invention relates to sulphoxide-containing esters of the phosphoric and thiophosphoric acids and to a process for producing these esters.

This application is a continuation-in-part of application Serial No. 544,832, filed November 3, 1955, now abandoned.

These esters generally correspond to the following formula $$R_1-\overset{O}{\underset{\|}{S}}-Alk-X-\overset{Y}{\underset{\|}{P}}\diagdown^{OR}_{OR}$$

in which $R_1$ denotes an alkyl, aralkyl or aryl radical; Alk an alkylene radical;

$$-X-\overset{Y}{\underset{\|}{P}}\diagdown$$

a direct linkage between Alk and $$-\overset{O(S)}{\underset{\|}{P}}\diagdown\quad -S-\overset{S}{\underset{\|}{P}}\diagdown\quad \text{or}\quad -O-\overset{S}{\underset{\|}{P}}\diagdown$$

and R any alkyl radical.

Many thiophosphoric acid esters have become well known during the last years as effective insecticides or generally pesticides. Thus, especially compounds which differ from the above formula in having an oxygen instead of the thiol sulphur group, have become very important compounds, one of them, O.O-diethyl-O-p-nitrophenyl-thiophosphoric acid ester being known as Parathion. However, it has been found that compounds with low toxicity against mammals, with good resistance against hydrolytic action, with especially contact-insecticidal properties and with other outstanding properties are always needed.

An object of the present invention is to provide phosphoric acid esters containing sulphoxide groups, said esters being useful for a variety of purposes, in particular as insecticides.

Another object of the invention is to provide a new process of preparing valuable and highly effective phosphoric acid esters containing sulphoxide groups.

Further objects will be apparent from the following description.

Esters of phosphoric and thiophosphoric acids or their corresponding phosphonic acids which contain the sulphoxide group in an ester group as they are embraced by the above formula have not hitherto been described, and it has been found in accordance with this invention that these esters exhibit outstanding insecticidal properties.

In accordance with this invention it has further been found that phosphoric acid esters of the above general formula $$R_1-S-Alk-X-\overset{Y}{\underset{\|}{P}}\diagdown^{OR}_{OR}$$

wherein $R_1$ denotes an alkyl, aralkyl or aryl radical; Alk an alkylene radical;

$$-X-\overset{Y}{\underset{\|}{P}}\diagdown$$

a direct linkage between Alk and $$-\overset{O(S)}{\underset{\|}{P}}\diagdown\quad -S-\overset{S}{\underset{\|}{P}}\diagdown\quad \text{or}\quad -O-\overset{S}{\underset{\|}{P}}\diagdown$$

and R any alkyl radical, may be oxidized to the inventive sulphoxides with hydrogen peroxide.

Examples of alkyl radicals are especially lower alkyl radicals from 1 to 6 carbon atoms, alkoxy-substituted alkyl radicals, or halogen-substituted alkyl radicals. The aralkyl or aryl radicals may carry further substituents, for instance alkyl, alkoxy, halogen, nitro, amino, carboxy, and cyano groups. The alkylene radical may be branched or straight-chained with preferably 1–6 carbon atoms.

Various processes are known from the literature for the preparation of sulphide esters suitable as starting materials. The mercaptophosphonic acid esters (wherein —X— means the direct link —C—P—) may easily be obtained for example by reacting chloralkyl-alkyl sulphides with sodium dialkyl phosphites. This reaction proceeds according to the following scheme:

$$R-S-(CH_2)_n-Cl+Na\overset{O}{\underset{\|}{P}}\diagdown^{OR}_{OR} \longrightarrow R-S-(CH_2)_n-\overset{O}{\underset{\|}{P}}\diagdown^{OR}_{OR}+NaCl$$

The mercapto esters of thiophosphoric acid can be produced for example from the chloralkyl-alkyl sulphides and the alkali metal or ammonium salts of dialkyl-thiol-phosphoric acid.

$$R-S-(CH_2)_n-Cl+NH_4S-\overset{O}{\underset{\|}{P}}\diagdown^{OR}_{OR} \longrightarrow$$

$$R-S-(CH_2)_n-S-\overset{O}{\underset{\|}{P}}\diagdown^{OR}_{OR}+NH_4Cl$$

The "inverted" mercapto esters of thiono-phosphoric acid may be obtained for example according to the process disclosed in U.S. Patent No. 2,571,989.

It is known that the phosphoric acid esters or thiophosphoric acid esters containing mercapto groups are splittable by hydrolysis and are sensitive to oxidizing agents. By eliminating the sulphur linked to phosphorus by a double bond with the aid of oxidizing agents, the corresponding oxygen compounds are obtained. It is very surprising that the thioether-containing phosphoric acid esters and especially the dithiophosphoric acid esters would homogeneously be oxidized with hydrogen peroxide to the desired sulphoxides in a smooth reaction.

The oxidation of thioether-containing phosphoric acid or thiophosphoric acid esters is advantageously carried out in water-miscible organic solvents such as lower alcohols or ketones. Surprisingly it has further been found that the alcohol which is present in the phosphoric acid esters concerned as alkyl radical is especialy suitable as solvent in the oxidation. With methyl esters, methanol is therefore the most suitable solvent, but other solvents may also be used, such as for example glacial acetic acid, or acetone.

Moderate temperatures (10° up to 60° C.) are most suitable for oxidation but lower or higher temperatures may also be used. For the oxidation preferably one mol of hydrogen peroxide is used per mol of thioether-containing phosphoric acid ester. An excess of hydrogen peroxide is not detrimental to the oxidation of thioether-containing phosphoric acid esters but affects the oxidation of thioether-containing thiophosphoric acid esters for the reasons stated above when replacing the sulphur by oxygen.

These sulphoxide-containing phosphoric acid esters exhibit the following properties: They are extensively water-miscible to water-soluble and are extensively insensitive to hydrolytic influences in acid to neutral media. The new sulphoxides are particularly valuable in that they show an improved systemic insecticidal action compared with the starting materials. They show a prolonged action compared with the starting materials since the sulphoxide esters are more stable to the influence of hydrolysis.

The compounds of the present invention are generally valuable insecticides especially contact-insecticides and kill effectively insects such as flies, aphids, mites and the like. Usually they are to be applied in the same manner as other well known phosphorus containing insecticides i. e. in concentrations from about 0.0001 to about 1% in dilution with liquid or solid carriers. Examples of such liquid carriers are water, alcohols, liquid hydrocarbons, ketones and the like and as examples of solid carriers there may be named talc, chalk, bentonite, etc. Additional emulsifiers may be used, if necessary, and the new compounds may be dusted or sprayed e. g. as aerosols or brought in contact otherwise with living plants or insects.

Thus, if the O.O-diethyl-O-ethylsulphoxydoethyl-thiono-thiolphosphoric acid of the following formula

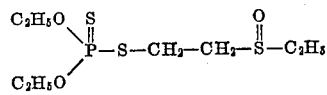

is dissolved in 1000 parts of water (with the addition of a minor amount of a commercial emulsifier such as a benzyl-diphenyloxy-polyglycol-ether containing 15 glycol residues) flies (Musca domestica) are killed completely. With the same compound in a concentration of 0.01% mosquito larvae are also killed completely.

The invention is further illustrated by the following examples but not limited thereto.

*Example 1*

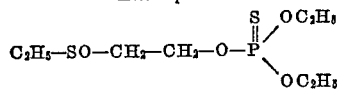

17 grams of (β-mercaptoethyl-) ethylthiono-phosphoric acid diethyl ester are dissolved in 20 millilitres of ethanol. 6.5 millilitres of 36 percent hydrogen peroxide are added dropwise to the solution at 35-40° C. After the reaction has subsided during which the reaction mixture must be slightly cooled, stirring is continued at 40° C. for 2 hours. In the clear neutral solution a little free hydrogen peroxide is still detectable but disappears on subsequent fractionating. 12-14 grams of the sulphoxide which boils at 95° C. at a pressure of 0.01 mm Hg are obtained by distillation in a high vacuum. Yield: 64-74 percent of the theoretical. The compound is only water-soluble to some extent.

*Example 2*

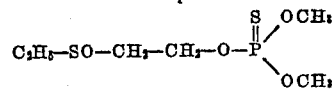

20 grams of β-ethylmercapto-ethyl-thionophosphoric acid-dimethylester in 20 millilitres of mthanol are oxidised with 8.5 millilitres of 36 percent hydrogen peroxide as described in the preceding examples. After usual working up there are obtained 14 grams of sulphoxide having a boiling point of 95-96° C., at a pressure of 0.01 mm. Hg in a yield of 66 percent of the theoretical. The compound is only water-soluble to some extent.

*Example 3*

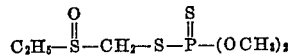

(O.O-dimethyl - S - (methyl - sulphoxyl - ethyl) - phosphate); 43 grams (0.2 mol) of O.O-dimethyl-S-methyl-thioethyl ether phosphate are dissolved in 5 cc. of methanol and reacted with 0.5 cc. of 50 percent sulphuric acid. While cooling and commencing at 20° C., 13 cc. of 38.4 percent hydrogen peroxide are added in drops so that the temperature is kept at 40-50° C. After stirring for one hour the slight excess of hydrogen peroxide is decomposed with some drops of sodium bisulphite solution, about 10-20 cc. of water and saturated potassium carbonate solution are added and the precipitated oil is taken up with methylene chloride. After briefly drying 37 grams of sulphoxyl ester are obtained as almost colourless water-soluble oil. Yield: 80.2 percent.

*Example 4*

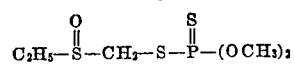

(O.O - dimethyl - S - (methyl - sulphoxyl - ethyl)-thionophosphate); 69 grams (0.3 mol) of O.O-dimethyl-S-methyl-thioethyl ether thionophosphate are dissolved in 100 cc. of glacial acetic acid, and 26 cc. of 39 percent hydrogen peroxide are added while maintaining a temperature of 40-50° C. After briefly heating to 70° C. the solvent is distilled off, the residue mixed with water, the solution neutralized with sodium carbonate solution and the precipitated oil taken up with methylene chloride. After briefly drying over sulphate and distilling off the solvent, 47 grams of the sulphoxyl ester are obtained as pale-yellow oil.

*Example 5*

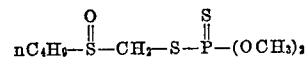

(O.O - dimethyl - S - (methyl - sulphoxyl - n - butyl)-thionophosphate); 34 grams of O.O-dimethyl-S-methyl-thio-n-butyletherthionophosphate are oxidized in 40 cc. of glacial acetic acid with 11.5 cc. of 39 percent hydrogen peroxide at 40-50° C. The mixture is heated for about 15 minutes until the hydrogen peroxide reaction ceases, then poured into water, the oil is taken up with benzene, washed with sodium carbonate solution, then with water, dried and distilled. 28 g. of the sulphoxyl ester are obtained as pale-yellow water-insoluble oil.

*Example 6*

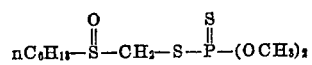

(O.O - dimethyl - S - (methyl - sulphoxyl - n - hexyl)-thionophosphate); 27.5 grams of O.O-dimethyl-S-methyl-thio-n-hexyletherthionophosphate (B.P.: 109° C. under 0.01 mm. Hg) are oxidized with 8.32 cc. of 39 percent hydrogen peroxide at 40-50° C. The mixture is heated to 70° C. for a short time, poured into water, the oil is taken up with benzene, washed with sodium carbonate solution and water, dried and 23 grams of the new ester are obtained by distilling as almost colourless oil.

*Example 7*

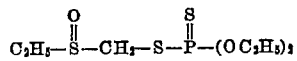

(O.O - diethyl - S - (methylsulphoxylethyl) - thionophosphate); 78 grams (0.3 mol) of O.O-diethyl-S-methylthioethyletherthionophosphate are dissolved in 100 cc. of glacial acetic acid and oxidized while cooling at 40–50° C. with 27.5 cc. of 38.9 percent hydrogen peroxide. The mixture is then heated to 70° C. for 30 minutes, poured into water and the oil is taken up with benzene. The benzene solution is washed once with 10 percent sodium carbonate solution, then with water and dried over sodium sulphate. After distilling off the solvent 68 grams of the sulphoxyl ester are obtained as almost colourless oil.

Example 8

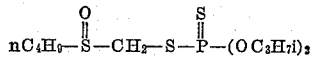

(O.O - diisopropyl - S - (methyl - sulphoxyl - n - butyl)-thionophosphate); 15.5 grams of O.O - diisopropyl - S-methyl-thio-n-butylether-thiono-phosphate (B.P.: 95° C. under 0.01 mm. Hg) are oxidized in 30 cc. of glacial acetic acid with 4.2 cc. of 39 percent hydrogen peroxide at 40–50° C. After working up as described in the preceding examples 12 grams of sulphoxyl ester are obtained as almost colourless oil. In analogous manner, O.O-diisopropyl-S-(methyl-sulphoxyl-n-hexyl) - thionophosphate is obtained from O.O-diisopropyl-S-methyl-thio-n-hexyl-ether-thionophosphate (B.P.: 115° C. under 0.01 mm. Hg) by oxidation with hydrogen peroxide in glacial acetic acid. Yield 77.5 percent of the theoretical.

Example 9

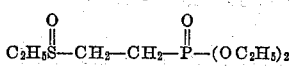

(O.O - diethyl - ethylsulphoxylethyl - phosphonate); 68 grams (0.3 mol) of O.O-diethyl-S-ethyl-thioethylether)-phosphonate, to which 5 cc. of methanol and 0.5 cc. of 50 percent sulphuric acid were added, are oxidized with the calculated amount of hydrogen peroxide; oxidation is started at 20° C. The temperature rapidly raises to 40° C. and is kept at 40–50° C. while cooling. After the oxidation is complete 50 cc. of water and 50 cc. of saturated potassium carbonate solution are added to the reaction solution. The precipitated oil is taken up with methylene chloride and dried over sodium sulphate. After distilling off the solvent the sulphoxyl phosphonate is obtained in a yield of 93.7 percent as colourless water-soluble oil (68 grams).

Example 10

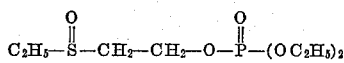

(O.O - diethyl - O - (ethylsulphoxylethyl) - phosphonate); 36 grams of O.O-diethyl-O-ethylthioethyl-ether-phosphate (B.P.: 82° C. under 0.01 mm. Hg), to which 5 cc. of methanol and 0.5 cc. of 50 percent sulphuric acid were added, are oxidized at 40–50° C. with 13 cc. of 38.4% hydrogen peroxide. After 60 minutes stirring at room temperature the slight excess of hydrogen peroxide is decomposed with some drops of sodium sulphite solution, water and potassium carbonate solution are added and the precipitated oil is taken up with methylene chloride. After drying with sodium sulphate, the solvent is distilled off and 33 g. of the sulphoxyl phosphate are obtained as colourless water-soluble oil. Yield: 85.8 percent of the theoretical.

Example 11

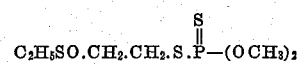

(O.O-dimethyl - S - (ethylsulphoxylethyl) - thionophosphate); 74 grams (0.3 mol) of O.O-dimethyl-S-ethyl-thioethyletherthionophosphate are dissolved in 37 cc. of methanol and reacted with 0.5 cc. of 50 percent sulphuric acid. 27.5 cc. of 36.8 percent hydrogen peroxide are added with cooling so that the temperature is kept at 40–50° C. After the reaction has subsided the mixture is stirred for another hour, 300 cc. of water are added and a slight excess of hydrogen peroxide is decomposed with sodium bisulphite solution. The precipitated oil is taken up in benzene and washed with water. After briefly drying the solvent is distilled off and the sulphoxyl ester is obtained as a colourless to pale-yellow, water-insoluble and neutral-reacting oil in a yield of 75.4 percent of the theoretical (59 grams).

Example 12

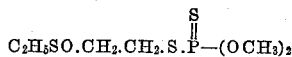

(O.O-dimethyl - S - (ethylsulphoxylethyl) - thionophosphate); to a solution of 74 grams (0.3 mol) of O.O-dimethyl-S-ethylthioether - thionophosphate in 74 cc. of glacial acetic acid are added dropwise with cooling at 40–50° C., 27.5 cc. of 36.8 percent of hydrogen peroxide within 30 minutes. After the reaction has subsided the mixture is stirred at room temperature for 60 minutes, 300 cc. of water are added and a small quantity of hydrogen peroxide is decomposed with some drops of sodium bisulphite solution. The precipitated oil then is taken up in benzene, washed first with water, then with dilute sodium carbonate solution and finally again with water. After drying with sodium sulphate and distilling off the solvent, 59 grams of sulphoxyl ester are obtained as almost colourless water-insoluble and Congo neutral-reacting oil which can be distilled only with decomposition at 110–120° C. under 0.01 mm. pressure. Yield: 75.4% of the theoretical.

Example 13

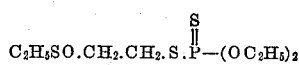

(O.O - diethyl - S - (ethylsulphoxylethyl) - thionophosphate); 137 grams (0.5 mol) of O.O-diethyl-S-ethylthio-ethylether-thionophosphate (B.P.: 140° C. under 2 mm. Hg) are dissolved in 137 cc. of glacial acetic acid and oxidized at 40–50° C. with the calculated amount of hydrogen peroxide. After the rapidly subsiding reaction, the mixture is stirred at room temperature for 60 minutes, diluted with 400–500 cc. of water, the oil is taken up with benzene, washed first with water and then with diluted sodium carbonate solution and finally with water. The solvent is dried with sodium sulphate and distilled off. 134 grams of the corresponding sulphoxyl ester are obtained as pale-yellow water-insoluble oil. Yield 92.4 percent of the theoretical.

The invention is not limited to the use of the esters specifically mentioned as starting materials but a number of other esters come within the scope of the invention, for instance mercapto methylene thiono-, thiol-, or thionothiol-phosphoric acid esters such as β-ethyl mercapto methyl thiolphosphoric acid diethyl ester, methyl mercapto methyl dithio-phosphoric acid dimethyl ester, β-ethyl mercapto ethyl phosphonic acid diethyl ester; furthermore, mercapto propylene phosphoric acid esters may be used as starting materials. Examples of this type are ethyl mercapto propyl thiolphosphoric acid dimethyl ester, ethyl mercapto propyl dithiophosphoric acid dimethyl ester, and methyl mercapto propyl thionophosphoric acid diethyl ester.

We claim:
1. A phosphoric acid ester of the following general formula

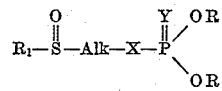

wherein $R_1$ is a lower alkyl radical; Alk is a lower alkylene group;

is a member selected from the group consisting of

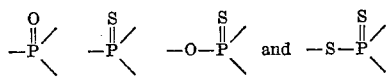

and R stands for lower alkyl radicals.

2. A phosphoric acid ester of the following general formula

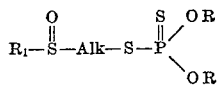

wherein $R_1$ is a lower alkyl radical, Alk is a lower alkylene group, and R stands for lower alkyl radicals.

3. A phosphoric acid ester of the following general formula

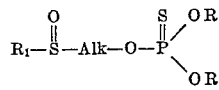

wherein $R_1$ is a lower alkyl radical, Alk is a lower alkylene group, and R stands for lower alkyl radicals.

4. A phosphoric acid ester of the following general formula

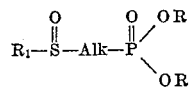

wherein $R_1$ is a lower alkyl radical, and Alk is a lower alkylene group, and R stands for lower alkyl radicals.

5. A compound of the following formula:

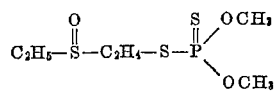

6. A compound of the following formula:

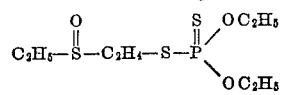

7. A compound of the following formula:

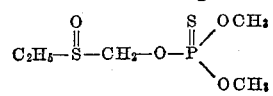

8. A compound of the following formula:

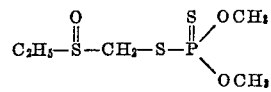

9. Process for the production of phosphoric acid esters claimed in claim 1, which comprises reacting a phosphoric acid ester of the following general formula

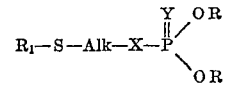

wherein $R_1$ is a lower alkyl radical; Alk is a lower alkylene group;

$$-X-\overset{Y}{\underset{}{P}}\diagdown$$

is a member selected from the group consisting of

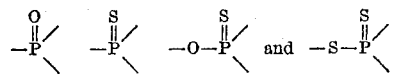

and R stands for lower alkyl radicals, with about molecular amounts of hydrogen peroxide at temperatures from about 10 to about 60° C.

References Cited in the file of this patent
UNITED STATES PATENTS 2,791,599    Lane et al.   ---------- May 7, 1957

FOREIGN PATENTS 871,448    Germany   ------------ Mar. 23, 1953
876,691    Germany   ------------ May 18, 1953
876,692    Germany   ------------ May 18, 1953

OTHER REFERENCES

Wagner et al.: Synthetic Organic Chemistry, 1953, page 801.
Fukuto et al.: Journal of Economic Entomology, 48, 347–354 (1955).